(12) United States Patent
Fukawatase et al.

(10) Patent No.: US 8,020,891 B2
(45) Date of Patent: Sep. 20, 2011

(54) VEHICULAR AIRBAG DEVICE

(75) Inventors: Osamu Fukawatase, Nishikamo-gun (JP); Tomotaka Kuroda, Okazaki (JP); Muneo Akashio, Aichi-ken (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/616,814

(22) Filed: Nov. 12, 2009

(65) Prior Publication Data

US 2010/0133798 A1     Jun. 3, 2010

(30) Foreign Application Priority Data

Nov. 12, 2008  (JP) ................................. 2008-289920

(51) Int. Cl.
*B60R 21/276* (2006.01)
(52) U.S. Cl. ........................................................ 280/739
(58) Field of Classification Search .................... 280/739
See application file for complete search history.

(56) References Cited

U.S. PATENT DOCUMENTS

| | | | |
|---|---|---|---|
| 6,139,048 | A | 10/2000 | Braunschadel |
| 7,347,450 | B2 | 3/2008 | Williams et al. |
| 7,413,218 | B2 | 8/2008 | Ekdahl |
| 2005/0040634 | A1 | 2/2005 | Braun et al. |
| 2006/0151979 | A1 | 7/2006 | DePottey et al. |

FOREIGN PATENT DOCUMENTS

| | | |
|---|---|---|
| DE | 4137810 C1 | 4/1993 |
| DE | 19640322 A1 | 3/1998 |
| JP | 06127330 A | 5/1994 |
| JP | 11222097 A | 8/1999 |
| JP | 2004155420 | 6/2004 |
| JP | 2004262432 A | 9/2004 |
| JP | 2007099103 A | 4/2007 |
| JP | 2007099104 A | 4/2007 |
| JP | 2008201214 A | 9/2008 |
| JP | 2008207579 A | 9/2008 |
| JP | 2008265721 A | 11/2008 |

*Primary Examiner* — Eric Culbreth
(74) *Attorney, Agent, or Firm* — Gifford, Krass, Sprinkle, Anderson & Citkowski, P.C.

(57) ABSTRACT

A vehicular airbag device includes an airbag and an opening degree change portion. The airbag is folded and accommodated in an accommodation portion provided in front of a vehicle seat. The airbag is deployed toward an occupant seated in the vehicular seat by being supplied with a gas when a head-on collision occurs, and has a vent hole that allows the gas to be discharged in restraining the occupant. The opening degree change portion changes an opening area of the vent hole in accordance with a direction of impact of an upper body of the occupant with the airbag during deployment of the airbag.

9 Claims, 10 Drawing Sheets

VEHICULAR AIRBAG DEVICE

INCORPORATION BY REFERENCE

The disclosure of Japanese Patent Application No. 2008-289920 filed on Nov. 12, 2008 including the specification, drawings and abstract is incorporated herein by reference in its entirety.

BACKGROUND OF THE INVENTION

1. Field of the Invention

The invention relates to a vehicular airbag device.

2. Description of the Related Art

In a conventional vehicular airbag device, a variable vent hole is provided so that the vent hole, which is open during the initial stages of airbag deployment, becomes closed by a strap while the airbag expands (see U.S. Pat. No. 7,347,450). The strap is coupled to the lower portion of the deployed airbag on it vehicle rear side and to the vent hole.

In a vehicle equipped with the vehicular airbag device, the airbag deploys between the passenger and an instrument panel when a head-on collision occurs to restrain the upper body of a passenger sitting in a vehicular seat. It should be noted herein that if the passenger sitting in the vehicular seat does not wear a seat belt in a jurisdiction where the use of a seat belt is not legally required, the body of the passenger moves wholly forward with respect to the vehicle due to inertia, and the upper body of the passenger wholly impacts with the airbag. In the structure of the airbag according to the related art, when the strap that is coupled to the lower portion of the airbag on the vehicle rear side is slack, the vent hole opens due to a rise in internal pressure resulting from the impact of the upper body of the passenger when the upper body of the passenger comes into contact with the airbag.

However, if the passenger sitting in the vehicular seat is restrained by the seat belt, the lower portion of the upper body of the passenger is restrained from moving forward with respect to the vehicle, and the direction of impact (the route of impact) of the upper body of the passenger differs from that when the passenger is not restrained by the seat belt. Therefore, the effective stroke of the airbag in restraining the passenger changes, and the reactive force of the airbag necessary to appropriately restrain the passenger changes as well. Further, when the passenger sitting in the vehicular seat is restrained by the seat belt, the lower portion of the upper body of the passenger is restrained from moving forward with respect to the vehicle. In the structure according to the related art, therefore, it is considered that the strap is unlikely to slack and the vent hole does not easily open.

SUMMARY OF THE INVENTION

The invention provides a vehicular airbag device that can adjust a reactive force of an airbag in restraining an occupant regardless of whether the occupant wears a seat belt.

A vehicular airbag device according to one aspect of the invention has an airbag and an opening degree change portion. The airbag is folded and accommodated in an accommodation portion provided in front of a vehicular seat, is deployed toward an occupant seated in the vehicular seat by being supplied with a gas when a head-on collision occurs, and includes a vent hole that allows the gas to be discharged to an outside of the airbag in restraining the occupant. The opening degree change portion changes an opening area of the vent hole in accordance with a direction of impact of an upper body of the occupant with the airbag during deployment of the airbag.

In the vehicular airbag device according to the foregoing aspect of the invention, the airbag, which is folded and accommodated in the accommodation portion provided in front of the vehicular seat, is deployed toward the occupant seated in the vehicular seat by being supplied with the gas when the head-on collision occurs, thus making it possible to restrain the upper body of the occupant moving due to inertia. It should be noted herein that the direction of impact (the route of impact) of the upper body of the occupant with the airbag differs depending on whether the occupant wears a seat belt or the occupant does not wear the seat belt in a jurisdiction where the use of a seat belt is not legally required. In the vehicular airbag device according to the foregoing aspect of the invention, however, the opening degree change portion can change the opening area of the vent hole in the airbag in accordance with the direction of impact of the upper body of the occupant with the airbag. Thus, the reactive force of the airbag in restraining the occupant can be adjusted the appropriate reactive force regardless of whether or not the occupant wears the seat belt.

Further, in the vehicular airbag device according to the foregoing aspect of the invention, the opening degree change portion may reduce the opening area of the vent hole when the upper body of the occupant wholly moves forward with respect to the vehicle to impact with the airbag, and increase the opening area of the vent hole when the upper body of the occupant rotates around a lumbar region thereof and the upper body of the occupant moves forward and downward to impact with the airbag.

In the vehicular airbag device according to the foregoing aspect of the invention, the opening degree change portion reduces the opening area of the vent hole when the upper body of the occupant wholly moves forward to impact with the airbag. Therefore, the gas supplied into the airbag is unlikely to be discharged from the vent hole. Accordingly, when the occupant seated in the vehicular seat does not wear the seat belt in a jurisdiction where the use of a seat belt is not legally required, a sufficient reactive force for the occupant can be ensured to restrain the occupant appropriately.

On the other hand, the opening degree change portion increases the opening area of the vent hole when the upper body of the occupant rotates around the lumbar region thereof and the upper body of the occupant moves forward and downward to impact with the airbag. Therefore, the gas supplied into the airbag is likely to be discharged from the vent hole. Accordingly, when the occupant seated in the vehicular seat wears the seat belt, the reactive force for the occupant can be reduced to restrain the occupant appropriately.

As described above, according to the vehicular airbag device according to the foregoing aspect of the invention, the reactive force of the airbag in restraining the occupant can be adjusted appropriately responding to a difference in the direction of impact of the upper body of the occupant with the airbag which depends on whether or not the occupant wears the seat belt.

Further, in the vehicular airbag device according to the foregoing aspect of the invention, the opening degree change portion may be provided at a position of the vent hole on an outer face of the airbag, and the opening degree change portion may have a valve body that covers the vent hole, and a tether that has an one end of the tether coupled to the valve body outside the airbag, that is in an interior of the airbag, that has the other end of the tether coupled to an occupant-side base fabric of the airbag, wherein, upon deployment the airbag, the tether is vertically stretched in a side view of the vehicle, and the tether urges the valve body so as to close the valve body.

In the vehicular airbag device according to the foregoing aspect of the invention, the opening degree change portion has the valve body and the tether, and the valve body is provided at the position of the vent hole on the outer face of the airbag and covers the vent hole. An end of the tether couples to the valve body outside the airbag and passed through the interior of the airbag from outside the airbag, and the other end of the tether couples to the occupant-side base fabric of the airbag. Upon deployment of the airbag, this tether is vertically stretched in a side view of the vehicle, and urges the valve body so as to close the valve body. Thus, the opening area of the vent hole decreases.

It should be noted herein that if the occupant seated in the vehicular seat does not wear the seat belt in a jurisdiction where the use of a seat belt is not legally required, the upper body of the occupant wholly relatively moves forward due to inertia when a head-on collision occurs, and the upper body of the occupant wholly impacts with the airbag. At this moment, the tether is vertically stretched vertically in a side view of the vehicle. Therefore, even when the upper body of the occupant wholly impacts with the airbag, the tether is unlikely to slack, and the valve body holds the opening area of the vent hole small. Thus, a sufficient reactive force of the airbag for the occupant can be ensured to restrain the occupant appropriately.

On the other hand, when the occupant seated in the vehicular seat wears the seat belt, and the upper body of the occupant rotates around the lumbar region thereof and the upper body of the occupant impacts with the airbag forward and downward, the airbag bends vertically. Therefore, the tether, which is vertically stretched in the side view of the vehicle, and that urges the valve body so as to close the valve body, slacks. The valve body then opens, and the opening area of the vent hole thereby increases. As a result, the gas in the airbag is likely to be discharged from the vent hole. Thus, the reactive force of the airbag for the occupant can be reduced to restrain the occupant appropriately.

As described above, according to the vehicular airbag device according to the foregoing aspect of the invention, the reactive force of the airbag in restraining the occupant can be adjusted appropriately responding to a difference in the direction of impact of the upper body of the occupant with the airbag which depends on whether or not the occupant wears the seat belt.

Further, in the vehicular airbag device according to the foregoing aspect of the invention, the vent hole may have a circular shape, and the valve body may have a triangular shape.

In the vehicular airbag device according to the foregoing aspect of the invention, the vent hole has the circular shape, and the valve body has the triangular shape. Therefore, while suppressing the area of the valve body, the opening area of the vent hole in a state where the valve body is closed can be set with ease by a mounting position of the valve body with respect to the vent hole.

Further, in the vehicular airbag device according to the foregoing aspect of the invention, the other end of the tether may be coupled to a central portion of the occupant-side base fabric in a vehicle width direction.

In the vehicular airbag device according to the foregoing aspect of the invention, the other end of the tether is coupled to the central portion of the occupant-side base fabric of the airbag in the vehicle width direction. Therefore, when the upper body of the occupant is at a normal position in the vehicular seat and moves forward and downward to impact with the central portion of the deployed airbag in the vehicle width direction when a head-on collision occurs, the tether swiftly slacks, the valve body opens, and the opening area of the vent hole increases. Thus, the reactive force of the airbag for the occupant can be more swiftly reduced to restrain the occupant appropriately.

Further, in the vehicular airbag device according to the foregoing aspect of the invention, the other end of the tether may be coupled to a region of the occupant-side base fabric located to a right or left of the central portion of the occupant-side base fabric in the vehicle width direction.

In the vehicular airbag device according to the foregoing aspect of the invention, the other end of the tether is coupled to the region of the occupant-side base fabric of the airbag located to the right or left of the central portion of the occupant-side base fabric in the vehicle width direction. Therefore, even in the case where the position of impact of the upper body of the occupant disperses in the vehicle width direction when the upper body of the occupant moves forward and downward to impact with the deployed airbag when an offset collision occurs, the tether slacks, the valve body opens, and the opening area of the vent hole increases. Thus, the reactive force of the airbag for the occupant can be more swiftly reduced to restrain the occupant appropriately.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 1 to 6B relate to the first embodiment of the invention.

FIGS. 9 and 10 relate to the third embodiment of the invention.

DETAILED DESCRIPTION OF EMBODIMENTS

The embodiments of the invention will be described hereinafter on the basis of the drawings.

Figure 1:
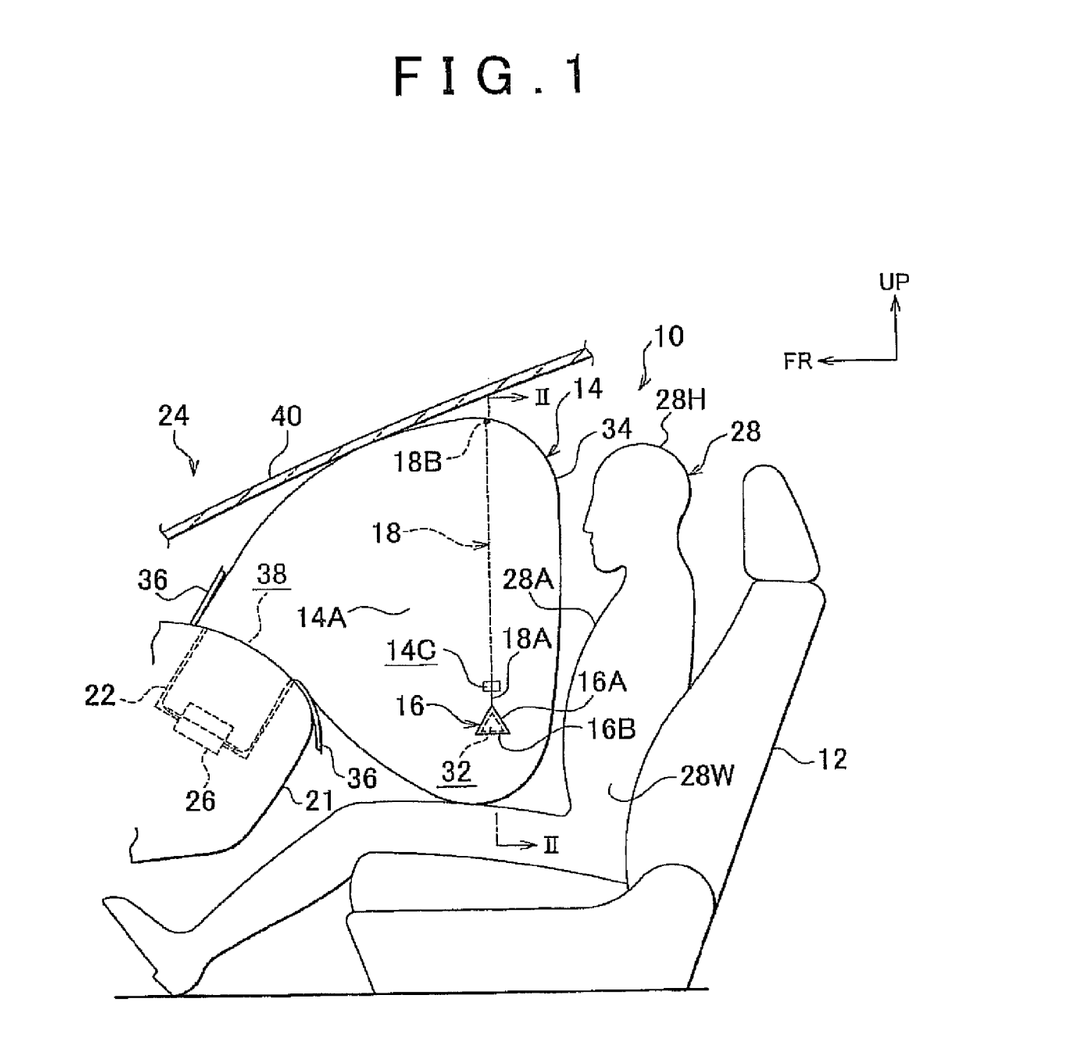
FIG. 1 is a side view showing an airbag when expanded/deployed in front of an occupant sitting in a front passenger seat.

In FIG. 1, a vehicular airbag device 10 according to the first embodiment of the invention is an airbag device so provided as to correspond to, for example, a front passenger seat 12 as an example of a vehicular seat. The vehicular airbag device 10 has an airbag 14, valve bodies 16 as an example of an opening degree change portion, and tethers 18.

The airbag 14 is generally folded when accommodated in an accommodation portion 22 provided in, for example, the instrument panel 21 before the front passenger seat 12, and is designed to deploy toward a passenger 28 sitting in the front passenger seat 12 when inflated with a gas from, for example, an inflator 26 when a head-on collision of a vehicle 24 occurs.

The accommodation portion 22 is, for example, a so-called module case. The inflator 26 is mounted on, for example, a bottom portion of the accommodation portion 22. An opening of the accommodation portion 22, which serves as an exit during expansion of the airbag 14, is closed by the instrument panel 21 or a door base member (not shown) that is disposed inside the instrument panel 21 and open due to an inflation pressure of the airbag 14, and the like. That region of the instrument panel 21 in which the opening of the accommodation portion 22 is designed to be openable in response to the rupture of a prearranged rupture portion (not shown) caused by an inflation pressure of the airbag 14.

Figure 6A:
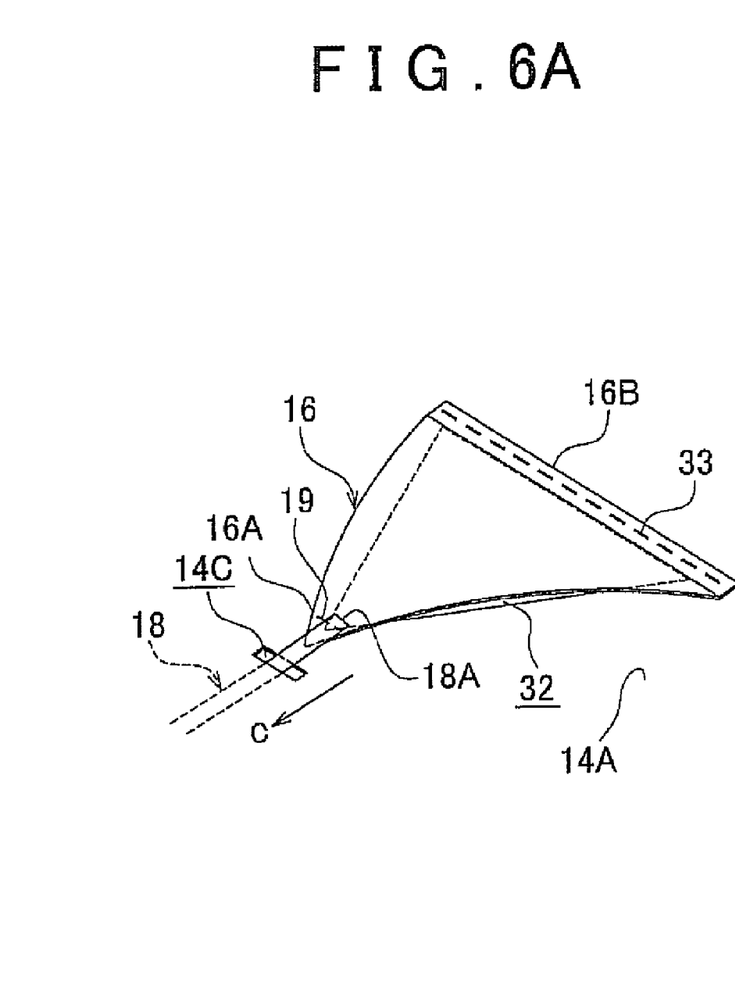
FIG. 6A is an enlarged perspective view showing a decrease in the opening area of the vent hole when the valve body closes due to a tensile force of the tether.
Figure 6B:
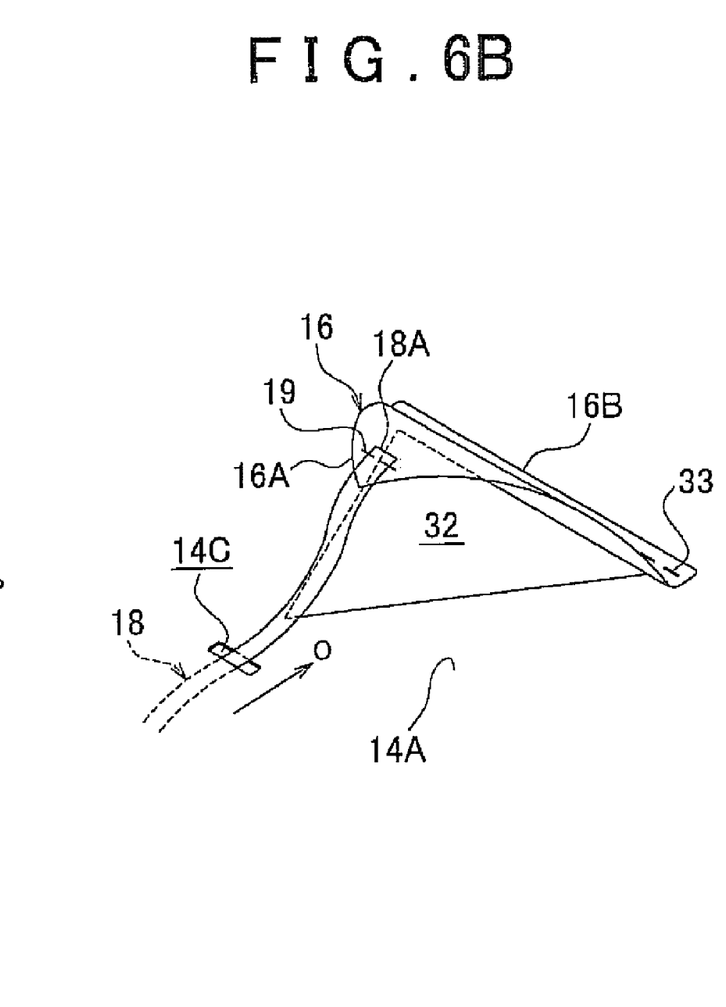
FIG. 6B is an enlarged perspective view showing an increase in the opening area of the vent hole due to the opening of the valve body resulting from a slack in the tether.

Further, the airbag 14 has vent holes 32 that allow a gas supplied from the inflator 26 to be discharged to the outside of the airbag 14 in restraining the passenger 28. As shown in FIGS. 1 and 6A and 6B, these vent holes 32 are formed in the shape of, for example, triangles (a generally equilateral triangle). The vent holes 32 are provided in, for example, both lateral sides 14A of the deployed airbag 14. The vent holes 32 are provided in the lower portions closer to the rear of the vehicle in the lateral portions 14A. One side of each of the triangular vent holes 32 is located, for example, in the lower portion of the triangular vent holes 32 closer to the lower of the airbag 14.

The inflator 26 supplies the airbag 14 with a gas for expansion in the event of a head-on collision of the vehicle 24, and is connected to an airbag ECU (not shown) via a wire harness (not shown). The inflator 26 is actuated by an actuation current from the airbag ECU and supplies the gas for expansion to the airbag 14. The airbag ECU causes an actuation current to flow through the inflator 26 when it is determined, based on a signal from a collision sensor (not shown), that a head-on collision has occurred.

Referring to FIG. 1, the valve bodies 16 and the tethers 18 serve as an opening degree change portion that changes the opening area of the vent holes 32 in accordance with the direction of impact of the passenger's upper body 28A with the airbag 14 during deployment of the airbag 14. As shown in FIGS. 1 and 6A, the valve bodies 16 are provided at the positions of the respective vent holes 32 on an outer face of the airbag 14. More specifically, the valve bodies 16 are formed in the shape of, for example, a triangle (a generally equilateral triangle) larger than the vent holes 32, using, for example, a material equivalent to the base fabric of the airbag 14. Further, for example, a lower side 16B of each of the valve bodies 16 is sewn on the outer face of a corresponding one of the lateral sides 14A of the airbag 14 along, for example, a lower side of the lateral sides 14A below the vent holes 32, using a thread 33. Each of the valve bodies 16 is designed to be capable of opening/closing around the lower side 16B with respect to the corresponding vent holes 32. Each tether 18 is sewn at one end 18A with, for example, a thread 19 to an upper corner 16A of a corresponding valve body 16, which is located above the lower side 16B.

Figure 2:
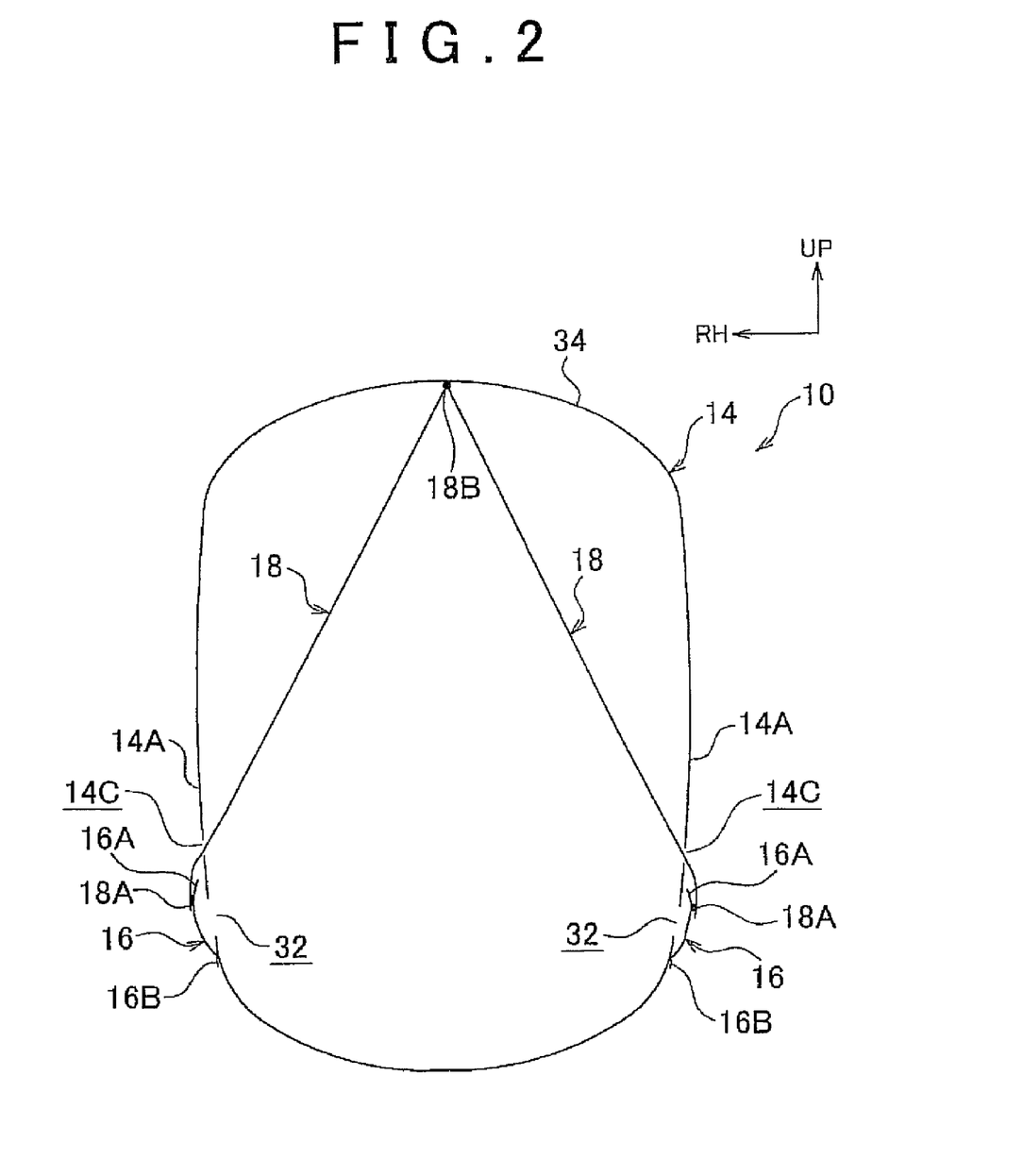
FIG. 2 is an enlarged sectional view of FIG. 1 taken along an arrow II-II, showing the expanded/deployed airbag.

Referring to FIGS. 1 and 2, the tethers 18 are non-extensible strip members. The end 18A of each tether 18 is coupled to a corresponding valve body 16 outside the airbag 14 and passed through an interior of the airbag 14 from outside the airbag 14, and the other end 18B of each tether 18 is coupled to a occupant-side base fabric 34 in the airbag 14. More specifically, the tethers 18 are provided for the valve bodies 16 on each side. Through-holes 14C, which are, for example, rectangular and into which the tethers 18 may be inserted respectively, are provided above the vent holes 32 in the respective lateral sides 14A of the airbag 14. The tethers 18 pass through the interior of the airbag 14 via the through-holes 14C respectively, and the other end 18B of each tether 18 is coupled to a central portion of the occupant-side base fabric 34 in the vehicle width direction (a ceiling portion of the airbag 14). As shown in FIG. 1, each tether 18 is stretched vertically in a side view of the vehicle during deployment of the airbag 14, and urges a corresponding one of the valve bodies 16 to close a corresponding valve body 16.

The first embodiment of the invention is designed as described above. The operation of the first embodiment of the invention will be described next. Referring to FIG. 1, in the vehicular airbag device 10 according to the first embodiment of the invention, when a head-on collision occurs and the airbag ECU determines that a collision has occurred based on the signal from the collision sensor (not shown), an actuation current is caused to flow from the airbag ECU to the inflator 26. The inflator 26 is actuated upon receiving the actuation current, and blows off a large amount of gas. The gas is supplied to the airbag 14, and the airbag 14 thereby begins to expand.

An inflation pressure of the airbag 14 acts on the instrument panel 21 or a door base member (not shown) located at the opening of the accommodation portion 22. When the inflation pressure becomes equal to or exceeds a predetermined pressure, the door base member ruptures and opens along a tear line (not shown). Further, a part of the instrument panel 21 also ruptures and opens. Thus, the door base member and the part of the instrument panel 21 serve as an airbag door 36 and open vertically upward with respect to the vehicle, and an opening 38 is formed in the instrument panel 21. The airbag 14 expands toward the passenger 28 from inside the instrument panel 21 through the opening 38, and deploys into a space defined by a front windshield 40, the instrument panel 21, and the passenger 28.

Each tether 18 is stretched vertically in a side view of the vehicle when the airbag 14 is deployed, and urges a corresponding valve body 16 provided on both lateral sides 14A of the airbag 14 so as to close the valve body 16. Thus, the opening area of the vent holes 32 decreases.

Figure 3:
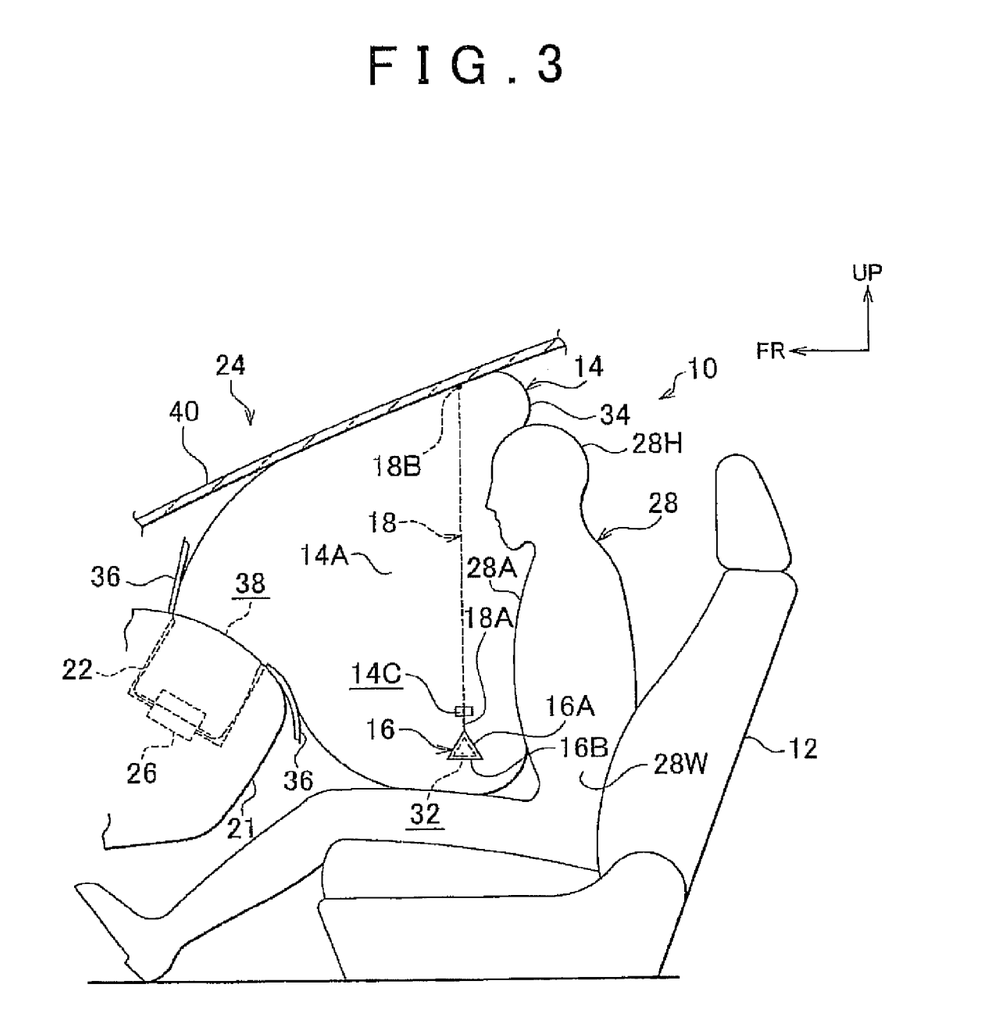
FIG. 3 is a side view showing the opening area of a vent hole when the opening area is covered by a valve body as the upper body of the occupant wholly moves forward due to inertia and the upper body of the occupant impacts the airbag.
Figure 4:
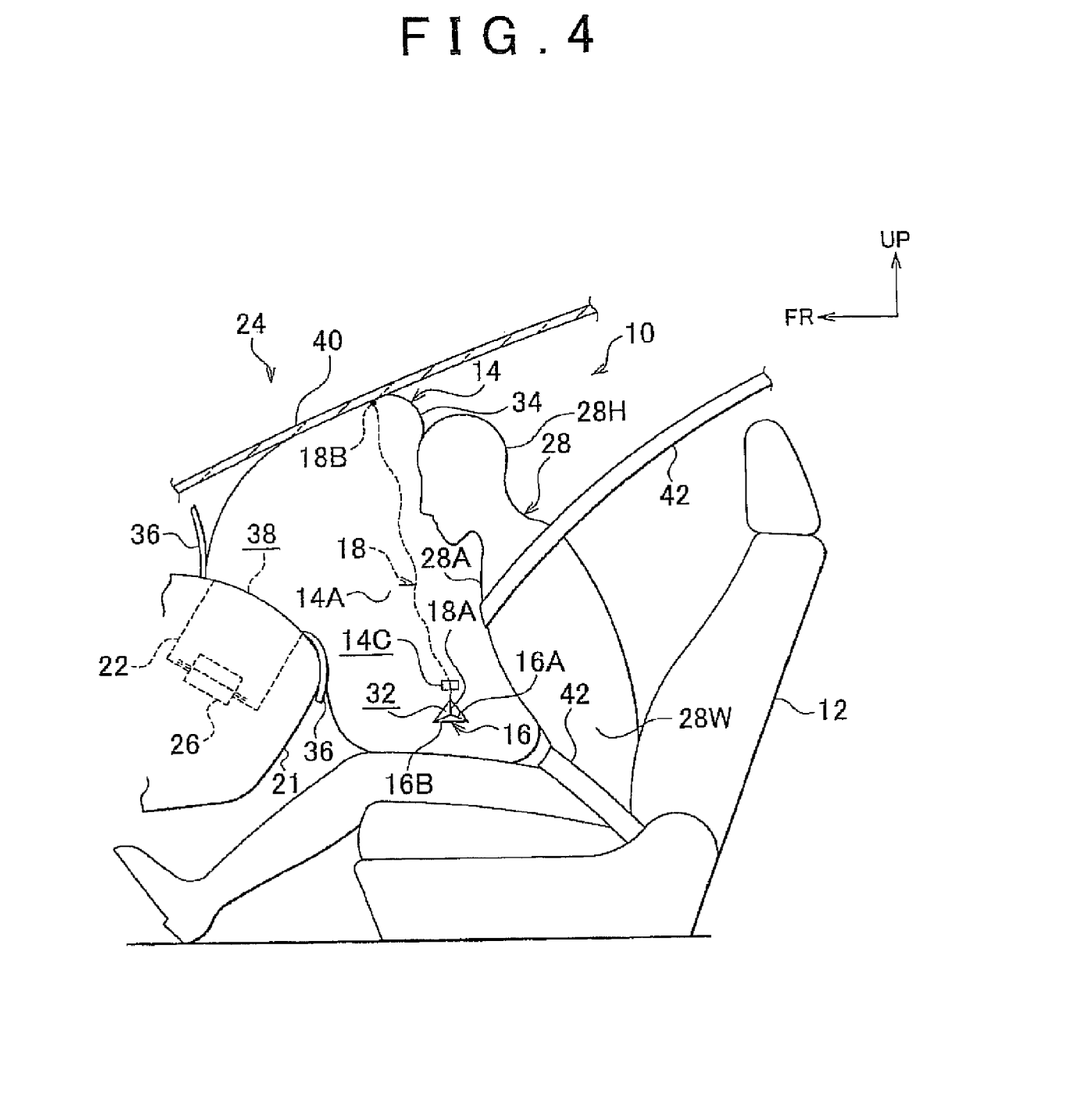
FIG. 4 is a side view showing a state where the airbag bends vertically, a tether slacks, the valve body opens, and the opening area of the vent hole is thereby enlarged when the upper body of the occupant rotates around a lumbar region thereof when impacting the airbag in a forward and downward direction.

It should be noted herein that the direction of impact (the route of impact) of the upper body 28A of the passenger 28 with the airbag 14 differs depending on whether the passenger 28 is wearing a seat belt 42 (FIGS. 3 and 4). In the vehicular airbag device 10 according to the first embodiment of the invention, the valve bodies 16 and the tethers 18 change the opening area of the vent holes 32 in accordance with the direction of impact of the upper body 28A of the passenger 28 with the airbag 14.

More specifically, as shown in FIG. 3, if the passenger 28 is not wearing a seat belt, the body of the passenger 28 moves forward respect to the vehicle due to inertia, and the upper body 28A of the passenger 28 wholly impacts with the airbag 14. Accordingly, each tether 18 is stretched vertically in a side view of the vehicle, to thereby urge a corresponding one of the attached valve bodies 16 to close the vent holes 32, namely, in a direction indicated by an arrow C of FIG. 6A. Therefore, even if the upper body 28A of the passenger 28 wholly impacts with the airbag 14, each of the tethers 18 is unlikely to slacken. As a result, each of the vent holes 32 is completely covered by a corresponding valve body 16, and the opening area of each of the vent holes 32 does not exist (or is held small). Accordingly, the gas supplied from the inflator 26 into the airbag 14 is unlikely to be discharged from the vent holes 32. Thus, a sufficient reactive force of the airbag 14 for the passenger 28 is ensured to appropriately restrain the passenger 28.

On the other hand, referring to FIG. 4, when the front seat passenger 28 wears the seat belt 42, and the upper body 28A, especially a head region 28H of the passenger 28 rotates around a lumbar region 28W and impacts with the airbag 14 forward and downward with respect to the vehicle, the airbag 14 bends vertically with respect to the vehicle. Therefore, each tether 18 slacks in a direction indicated by an arrow O of FIG. 6B. Each valve body 16 then opens, and the opening area of the corresponding vent hole 32 thereby increases. As a result, the gas in the airbag 14 is likely to be discharged from the vent holes 32 (see also FIG. 5). Thus, the reactive force of the airbag 14 for the passenger 28 may be reduced to restrain the passenger 28 appropriately.

According to the described vehicular airbag device 10 of the first embodiment, the reactive force of the airbag 14 in restraining the passenger 28 can be adjusted appropriately responding to a difference in the direction of impact of the upper body 28A of the passenger 28 with the airbag 14 depending on whether the passenger 28 is wearing a seat belt 42.

Figure 5:
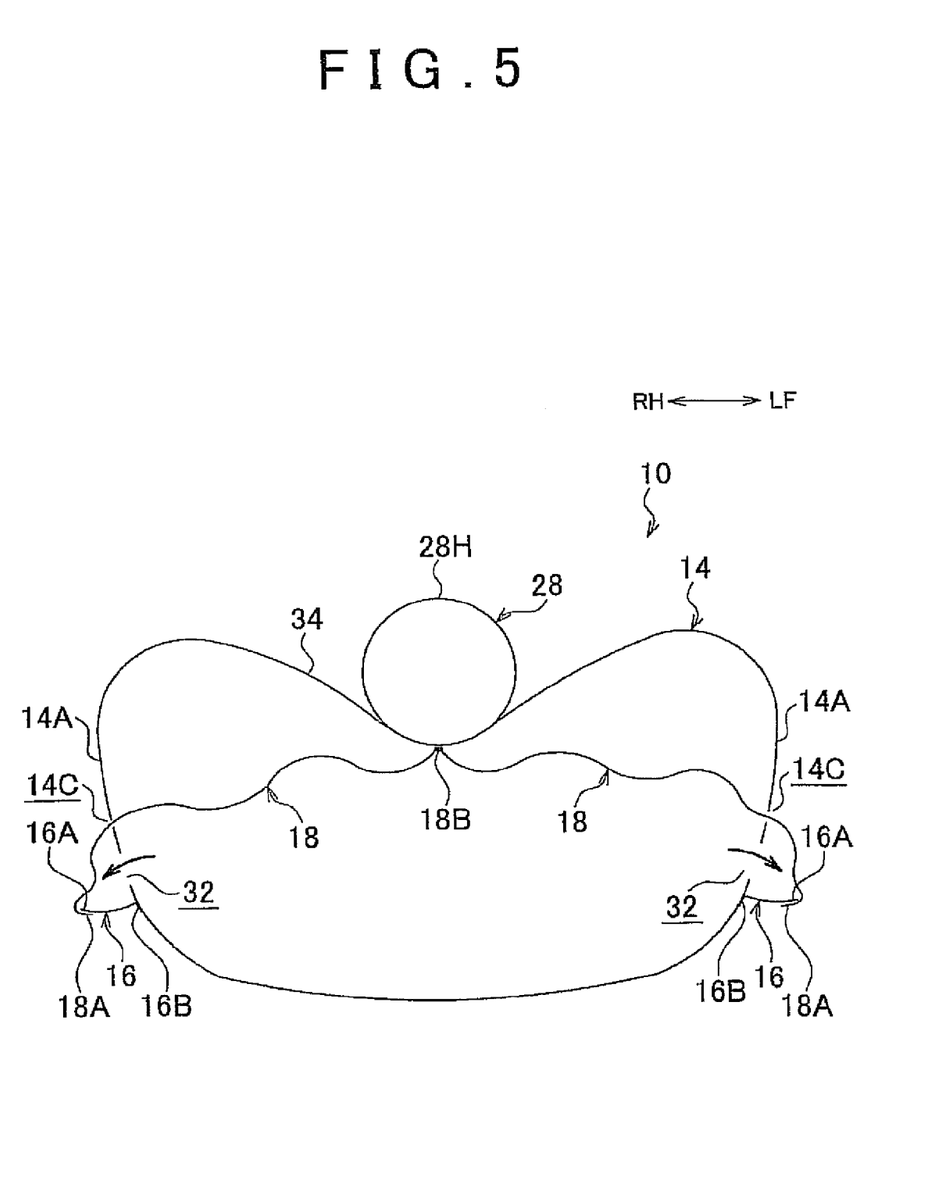
FIG. 5 is a transverse sectional view of the airbag in a state of FIG. 4.

Especially, as shown in FIG. 2, in this embodiment of the invention, the other end 18B of the each tether 18 is coupled to the central portion of the occupant-side base fabric 34 of the airbag 14 in the vehicle width direction. Therefore, if the upper body 28A (the head region 28H) of the passenger 28 is located at a normal position in the front passenger seat 12 and moves in a forward and downward direction to impact with the central portion of the deployed airbag 14 in the vehicle width direction as shown in FIG. 5 if a head-on collision of the vehicle 24 occurs, the tethers 18 on both the sides swiftly slacken, the valve bodies 16 open equally, and the opening area of the vent holes 32 on both the sides increases. Thus, the reactive force of the airbag 14 for the passenger 28 is reduced more swiftly to appropriately restrain the passenger 28.

Further, in the first embodiment of the invention, when the position of impact of the upper body 28A (the head region 28H) of the passenger 28 with the airbag 14 is the central portion of the occupant-side base fabric 34 in the vehicle width direction, the degree of slack in the tethers 18 in the initial stages of impact is high. Therefore, the discharge of the gas from the vent holes 32 may be promoted to weaken the reactive force of the airbag 14 in the initial stages of restraining the passenger 28.

Figure 7A:
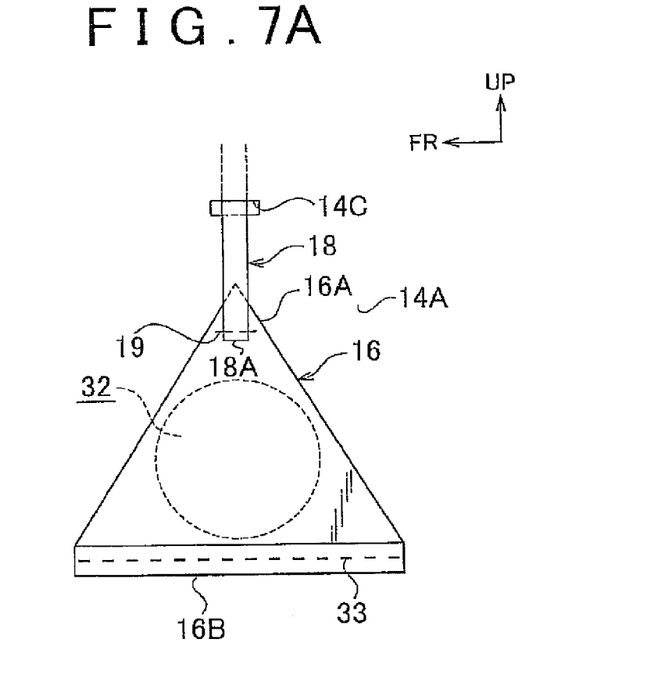
FIG. 7A is an enlarged side view showing the valve body when disposed to entirely cover the circular vent hole in the airbag.
Figure 7B:
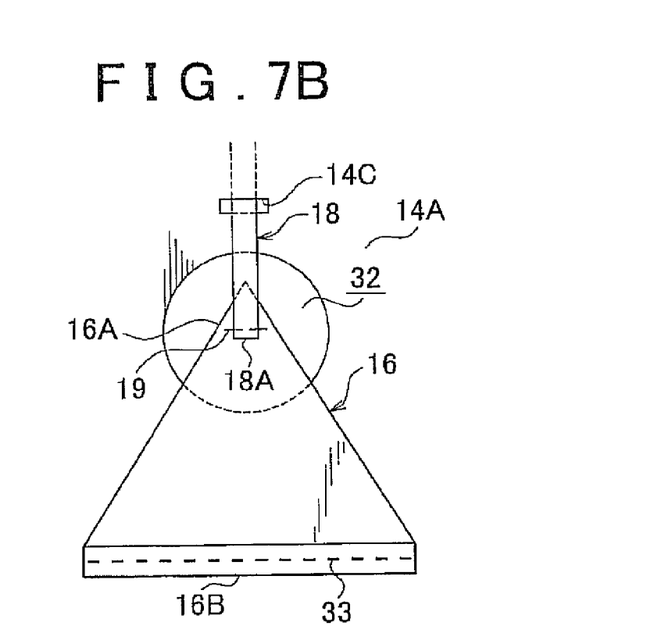
FIG. 7B is an enlarged side view showing the circular vent hole in the airbag partially covered by the valve body when the valve body is disposed offset downward with respect to the vehicle.

As shown in FIG. 7A, the vent holes 32 may be formed in the shape of a circle. In this example, the valve bodies 16 are designed in the shape of &triangle large enough to completely cover the vent holes 32. Thus, the area of the valve bodies 16 can be held small while ensuring a seam allowance of the valve bodies 16 and a mounting region of the end 18A of each of the tethers 18. Further, as shown in FIG. 7B, the position of each of the valve bodies 16 in the vertical direction of the vehicle may be offset vertically downward in comparison with the example shown in FIG. 7A so that each of the valve bodies 16, when closed, partially covers the corresponding vent hole 32. In this case, a certain amount of gas may be released even if the valve bodies 16 are closed. Further, the opening area of the vent holes 32 may be set with ease by adjusting the amount by which the vent holes 32 are covered with the valve bodies 16. In this example, the amount of change in the opening area of the vent holes 32 resulting from the opening/closing of the valve bodies 16 is relatively small. Therefore, the vehicle 24 is provided with a knee airbag device (not shown) for restraining knee regions of the passenger 28. This airbag device is applicable for the airbag system further having a knee airbag device because of the behavior of the upper body 28A of the passenger 28 when a head-on collision occurs does not substantially change depending on whether the passenger 28 wears the seat belt 42.

Figure 8A:
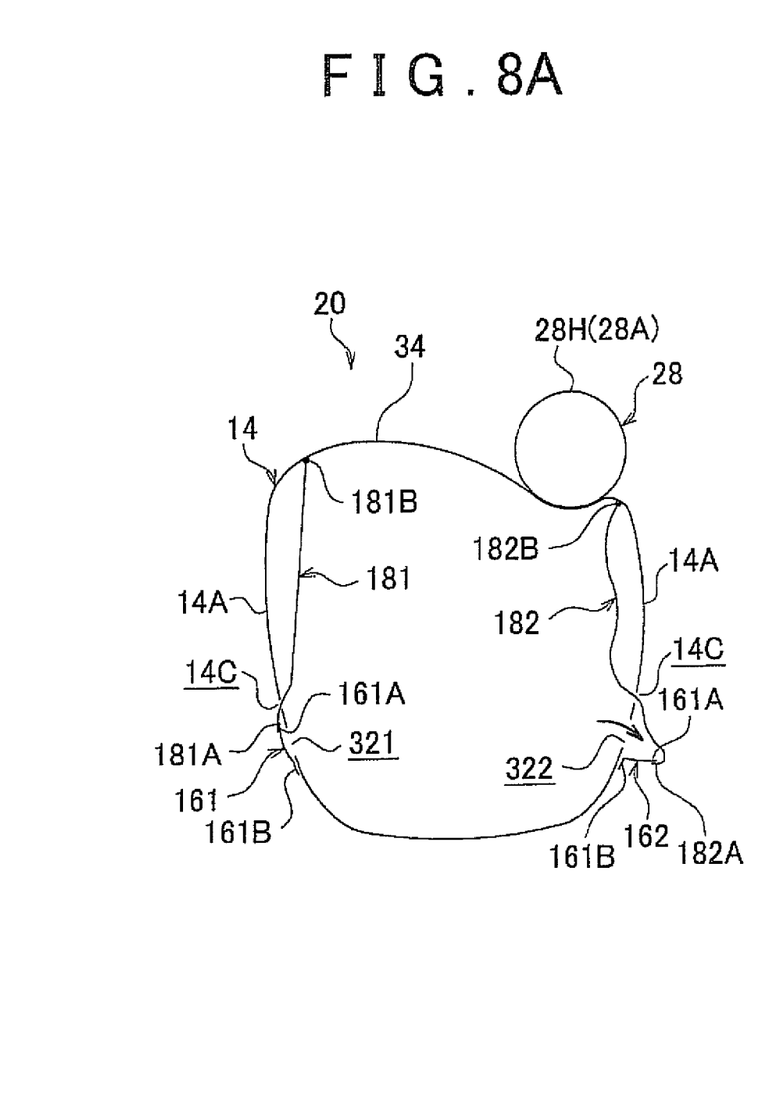
FIG. 8A is a transverse sectional view according to the second embodiment of the invention, showing an airbag when the upper body of the occupant impacts a left region of the expanded/deployed airbag in a vehicle width direction, a tether on the left side slacks, a valve body on the left side opens, and the opening area of a vent hole on the left side is thereby enlarged.
Figure 8B:
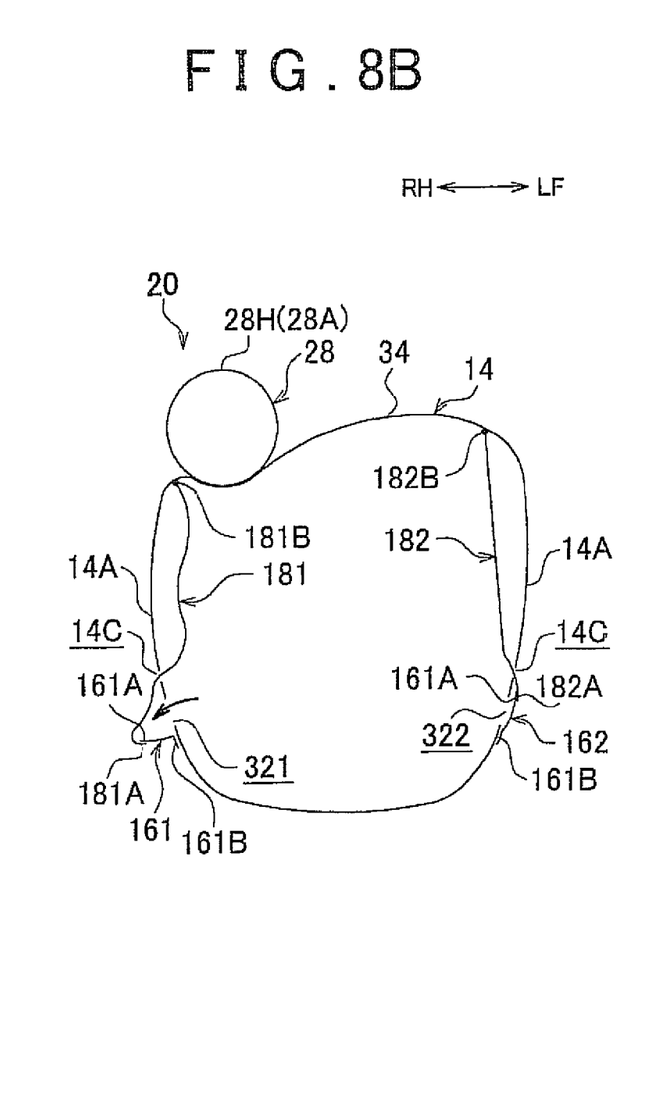
FIG. 8B is a transverse sectional view according to the second embodiment of the invention, showing an airbag when the upper body of the occupant impacts a right region of the expanded/deployed airbag in the vehicle width direction, a tether on the right side slacks, a valve body on the right side opens, and the opening area of a vent hole on the right side is thereby enlarged.

Referring to FIGS. 8A and 8B, in a vehicular airbag device 20 according to the second embodiment of the invention, the other end 181B of the tether 181 as a first tether and the other end 182B of the tether 182 as a second tether are coupled to the occupant-side base fabric 34 of the airbag 14 at a plurality of locations in the vehicle width direction. More specifically, the other end 181B of the right tether 181 (the first tether) is coupled to the region of the passenger-side base fabric 34 of the deployed airbag 14 located to the right of the central portion of the passenger-side base fabric 34 in the vehicle width direction. The one end 181A of the right tether 181 (the first tether) is coupled to the right valve body 161. Further, the other end 182B of the left tether 182 (the second tether) is coupled to the region of the passenger-side base fabric 34 located to the left of the central portion of the passenger-side base fabric 34 in the vehicle width direction. The one end 182A of the left tether 182 (the second tether) is coupled to the left valve body 162. The other end 182B of the right tether 182 and the other end 182B of the left tether 182 are arranged symmetrically to each other in the vehicle width direction with respect to the central portion of the occupant-side base fabric 34.

The second embodiment of the invention is identical in other details to the first embodiment of the invention. Therefore, the components of the second embodiment of the invention that are identical to those of the first embodiment of the invention are denoted by the same reference symbols respectively in the drawings and will not be described any further.

The second embodiment of the invention is designed as described above. The operation of the second embodiment of the invention will be described next. Referring to FIG. 8A, in the vehicular airbag device 20 according to the second embodiment of the invention, the other end 181B of the right tether 181 is coupled to the region of the occupant-side base fabric 34 of the airbag 14 located to the right of the central portion of the occupant-side base fabric 34, and the other end 182B of the left tether 182 is coupled to the region of the occupant-side base fabric 34 located to the left of the central portion of the occupant-side base fabric 34. Therefore, if the position of impact of the upper body 28A (the head region 28H) of the passenger 28 disperses to the left or to the right in the vehicle width direction if the passenger 28 wears the seat belt 42 and the upper body 28A (the head region 28H) of the passenger 28 impacts with the deployed airbag 14 and moves forward and downward with respect to the vehicle when, for example, an offset collision of the vehicle 24 (see FIG. 4) occurs, the respective tethers 181, 182 slacken in substantially the same manner, the respective valve bodies 161, 162 open, and the opening area of the vent holes 321, 322 increases.

More specifically, as shown in FIG. 8A, when the position of impact of the upper body 28A (the head region 28H) of the passenger 28 with the airbag 14 shifts to the left from the central portion of the occupant-side base fabric 34 when, for example, an offset collision occurs, the left tether 182 slackens, and the left valve body 162, to which the one end 182A of the left tether 182 is coupled, opens. Therefore, the opening area of the left vent hole 322 increases, and the gas in the airbag 14 is likely to be discharged from the vent hole 322.

Further, if the position of impact of the upper body 28A (the head region 28H) of the passenger 28 with the airbag 14 shifts to the right from the central portion of the occupant-side base fabric 34, the right tether 181 slackens, and the right valve body 161, to which the one end 181A of the right tether 181 is coupled, opens. Therefore, the opening area of the right vent hole 321 increases, and the gas in the airbag 14 is likely to be discharged from the vent hole 321. Thus, even when the position of impact of the passenger 28 with the airbag 14 disperses to the left or to the right, the reactive force of the airbag 14 for the passenger 28 may be swiftly reduced to appropriately restrain the passenger 28.

Furthermore, in the second embodiment of the invention, when the position of impact of the upper body 28A (the head region 28H) of the passenger 28 with the airbag 14 is the central portion of the occupant-side base fabric 34, the degree of slack in the tethers 181, 182 in the initial stages of impact is low. Therefore, the gas is restrained from being discharged through the vent holes 321, 322 to maintain the thickness of the airbag 14, and the reactive force of the airbag 14 in the initial stages of restraint of the passenger 28 can be enhanced.

Figure 9:
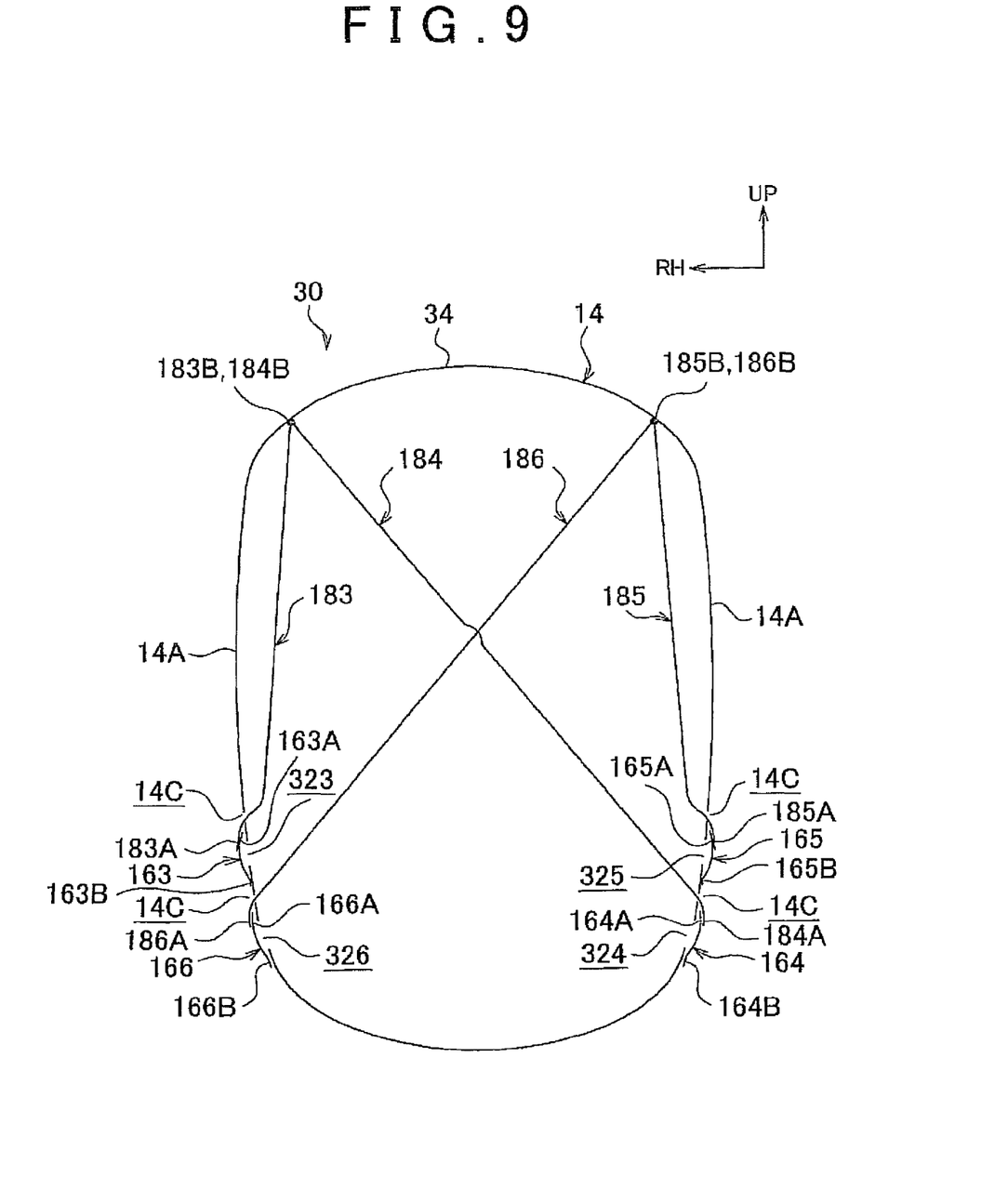
FIG. 9 is a sectional view equivalent to FIG. 2, showing the expanded/deployed airbag.

Referring to FIG. 9, in a vehicular airbag device 30 according to the third embodiment of the invention, for example, the two vent holes 323, 326, and 324, 325, are formed in each of the lateral sides 14A on both the sides of the airbag 14, and the valve body 163, 164, 165, 166 is provided for each vent hole 323, 324, 325, 326. The vent holes 323, 326, and 324, 325 may be aligned vertically with respect to the vehicle in the lateral sides 14A of the airbag 14.

In the third embodiment of the invention, for example, the four tethers 183, 184, 185, 186 are provided. These tethers 183, 184, 185, 186 are constituted by two pairs of the two tethers 183, 184, and 185, 186, that is, theses tethers 183, 184, 185, 186 are constituted by one pair of the first tethers 183, 184 and one pair of the second tethers 185, 186. The other ends 183B, 184B of one pair of the first tethers 183, 184 are coupled to the region of the occupant-side base fabric 34 of the deployed airbag 14 located to the right of the central portion of the occupant-side base fabric 34, and the other ends 185B, 186B of one pair of the second tethers 185, 186 are coupled to the region of the occupant-side base fabric 34 located to the left of the central portion of the occupant-side base fabric 34.

The one end 183A of one of the first tethers 183, 184 whose other end 183B, 184B is coupled to the region of the occupant-side base fabric 34 located to the right is coupled to the upper corner portion 163A of the first valve body 163 located on the upper right side of the airbag 14, and the one end 184A of the other of the first tether 184 is coupled to the upper corner portion 164A of the third valve body 164 located on the lower left side of the airbag 14. In the same way, the one end 186A of one of the second tethers 185, 186 whose other end 186B is coupled to the region of the occupant-side base fabric 34 located to the left is coupled to the upper corner portion 166A of the second valve body 166 located on the lower right side of the airbag 14, and the one end 185A of the other of the second tethers 185, 186 is coupled to the upper corner portion 165A of the fourth valve body 165 located on the upper left side of the airbag 14.

As described above, in the third embodiment of the invention, the occupant-side base fabric 34 is coupled at a plurality of locations thereof in the vehicle width direction to the valve bodies 163, 164, 165, 166 by the tethers 183, 184, 185, 186 respectively.

The third embodiment of the invention is identical in other details to the first embodiment of the invention or the second embodiment of the invention. Therefore, the components of the third embodiment of the invention that are identical to those of the first embodiment or the second embodiment of the invention are denoted by the same reference symbols respectively in the drawings and will not be described any further.

Figure 10A:
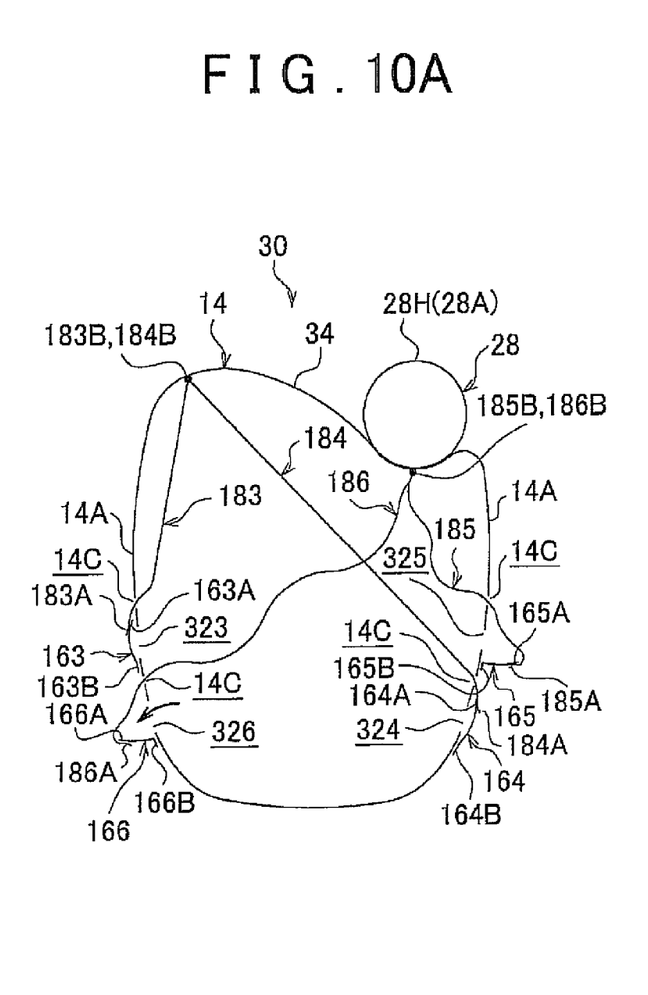
FIG. 10A is a transverse sectional view showing an airbag when the upper body of the occupant impacts a left region of the expanded/deployed airbag in the vehicle width direction, a tether coupled to the left side of an occupant-side base fabric slacks, valve bodies on both sides which are coupled to the tether open, and the opening area of vent holes on both the sides is thereby enlarged.
Figure 10B:
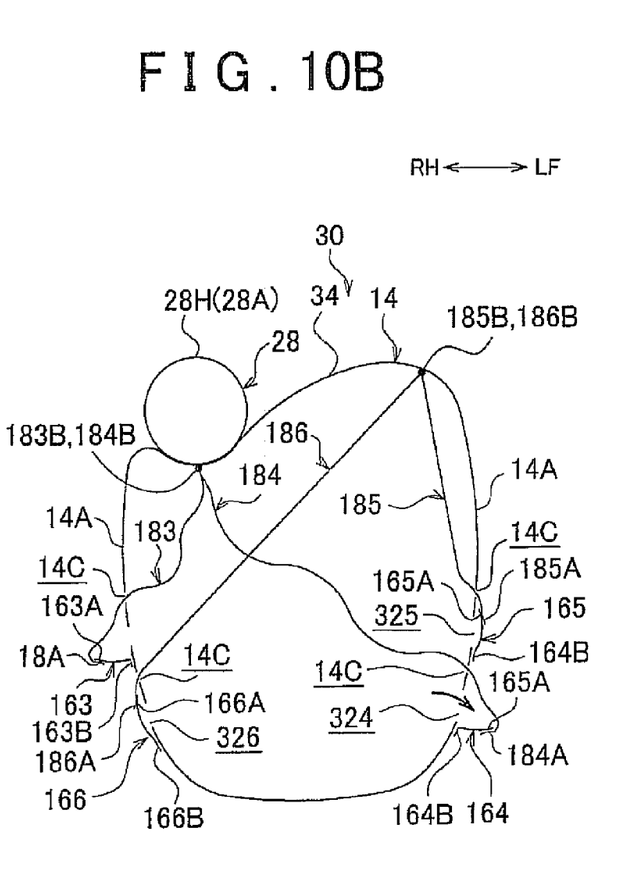
FIG. 10B is a transverse sectional view showing an airbag when the upper body of the occupant impacts a right region of the expanded/deployed airbag in the vehicle width direction, a tether coupled to the right side of the occupant-side base fabric slacks, the valve bodies on both sides which are coupled to the tether open, and the opening area of the vent holes on both the sides is thereby enlarged.

The third embodiment of the invention is designed as described above. The operation of the third embodiment of the invention will be described next. Referring to FIGS. 10A and 10B, in the vehicular airbag device 30 according to the third embodiment of the invention, the valve bodies 163, 164, 165, 166 are provided on both lateral sides 14A of the airbag 14 in the vehicle width direction respectively. The right and left sides of the passenger-side base fabric 34 are coupled to the respective valve bodies 163, 164, 165, 166 by the tethers 183, 184, 185, 186 respectively. Therefore, even if the position of impact of the upper body 28A (the head region 28H) of the passenger 28 disperses to the right or the left in the vehicle width direction when the upper body 28A (the head region 28H) of the passenger 28 impacts with the deployed airbag 14 and moves forward and downward when, for example, an offset collision occurs, the valve bodies 163, 164 or 165, 166 on both the sides open.

More specifically, as shown in FIG. 10A, when the position of impact of the upper body 28A (the head region 28H) of the passenger 28 with the airbag 14 shifts to the left from the central portion of the occupant-side base fabric 34 when, for example, an offset collision occurs, the pair of second tethers 185, 186, which are coupled to the left side of the occupant-side base fabric 34 at the other ends 185B, 186B, slacken, and the second valve body 166 and the fourth valve body 165, to which the one ends 185A, 186A of the second tethers 185, 186 are coupled respectively, open. Thus, the opening area of the pair of the vent holes 325, 326 increases so that gas in the airbag 14 may be discharged through the vent holes 325, 326.

Further, as shown in FIG. 10B, when the position of impact of the upper body 28A (the head region 28H) of the passenger 28 with the airbag 14 shifts to the right from the central portion of the occupant-side base fabric 34, the pair of first tethers 183, 184, coupled to the right side of the occupant-side base fabric 34 at other ends 183B, 184B, slacken, and the first valve body 163 and the third valve body 164 to which the one ends 183A, 184A of the first tethers 183, 184 are coupled respectively, open. Thus, the opening area of the pair of the vent holes 323, 324 increases so that gas in the airbag 14 may be discharged through the vent holes 323, 324.

As described above, in the vehicular airbag device 30 according to the third embodiment of the invention, even if the position of impact of the upper body 28A (the head region 28H) of the passenger 28 with the deployed airbag 14 disperses to the right or the left in the vehicle width direction, the opening areas of the vent holes 323, 324, or 325, 326 are larger than that of the second embodiment of the invention. Therefore, the reactive force of the airbag 14 for the passenger 28 may be more swiftly reduced to appropriately restrain the passenger 28.

In the second and third embodiments of the invention, the other ends 181B, 182B, 183B, 184B, 185B, 186B of the tethers 181, 182, 183, 184, 185, 186 are coupled to the passenger-side base fabric 34 at two locations in the vehicle width direction. However, the other ends 181B, 182B, 183B, 184B, 185B, 186B of the tethers 181, 182, 183, 184, 185, 186 may coupled to the occupant-side base fabric at additional locations.

Further, in each of the foregoing embodiments of the invention, the tethers 18, 181, 182, 183, 184, 185, 186 are passed through the interior of the airbag 14 from outside the airbag 14 through the through-hole 14C provided through a corresponding lateral side 14A of the airbag 14. However, the invention is not limited to this configuration. For example, a configuration in which each tether 18, 181, 182, 183, 184, 185, 186 is passed through the interior of the airbag 14 from outside the airbag 14 through a corresponding vent hole 32, 321, 322, 323, 324, 325, 326 is also acceptable.

Furthermore, the front passenger seat 12 is mentioned as an example of the vehicular seat, and each of the vehicular airbag devices 10, 20, and 30 is designed as an airbag device for a front passenger seat. The vehicular airbag devices are not restricted to airbag devices for the front passenger seat.

Further, the valve bodies 16, 161, 162, 163, 164, 165, 166 and the tethers 18, 181, 182, 183, 184, 185, 186 are described as an example of the opening degree change portion. However, the opening degree change portion is not limited to the valve bodies 16, 161, 162, 163, 164, 165, 166 and the tethers 18, 181, 182, 183, 184, 185, 186. Other means may be employed as long as the reactive force of the airbag 14 in restraining the passenger 28 may be changed by changing the opening area of the vent holes 32, 321, 322, 323, 324, 325, 326 regardless of whether the passenger 28 is restrained by the seat belt.

What is claimed is:

1. A vehicular airbag device comprising:
    an airbag that is folded and accommodated in an accommodation portion provided in front of a vehicular seat, wherein the airbag is deployed toward an occupant seated in the vehicular seat by being supplied with a gas when a head-on collision occurs, and includes a vent hole that allows the gas to be discharged to an outside of the airbag in restraining the occupant; and
    an opening degree change portion that changes an opening area of the vent hole in accordance with a direction of impact of an upper body of the occupant with the airbag during deployment of the airbag, the opening degree change portion includes a valve body and a tether, the valve body is provided at a position on an outer face of the airbag so as to cover the vent hole, the tether has one end coupled to the valve body outside of the airbag and the other end of the tether is attached to an interior ceiling portion of the airbag;
    wherein, upon deployment of the airbag, the tether is vertically stretched in a side view of the vehicle, and the tether urges the valve body so as to close the vent hole, and wherein the opening degree change portion reduces the opening area of the vent hole when the upper body of the occupant wholly moves forward to impact with the airbag, and increases the opening area of the vent hole when the upper body of the occupant rotates around a lumbar region thereof and the upper body of the occupant moves forward and downward to impact with the airbag.

2. The vehicular airbag device according to claim 1, wherein
    the valve body, when closed, completely covers the vent hole.

3. The vehicular airbag device according to claim 1, wherein
    the valve body, when closed, partially covers the vent hole.

4. The vehicular airbag device according to claim 1, wherein
    the vent hole has a circular shape, and
    the valve body has a triangular shape.

5. The vehicular airbag device according to claim 1, wherein
    the other end of the tether couples to a central portion of the interior ceiling portion in a vehicle width direction.

6. The vehicular airbag device according to claim 1, wherein
    the other end of the tether couples to a region of the interior ceiling portion located to a right or left of a central portion in a vehicle width direction.

7. A vehicular airbag device comprising:
    an airbag that is folded and accommodated in an accommodation portion provided in front of a vehicular seat, wherein the airbag is deployed toward an occupant seated in the vehicular seat by being supplied with a gas when a head-on collision occurs, the airbag includes a right vent hole provided in a right side portion of the airbag in a vehicle width direction and a left vent hole provided in a left side portion of the airbag in the vehicle width direction, the right vent hole and the left vent hole allow the gas to be discharged to an outside of the airbag in restraining the occupant; and
    an opening degree change portion that changes an opening area of each of the right vent hole and the left vent hole in accordance with a direction of impact of an upper body of the occupant with the airbag during deployment of the airbag, the opening degree change portion includes a right valve body, a left valve body, and at least a first tether and a second tether,
    the right valve body is positioned on an outer face of the airbag so as to open or close the right vent hole, and the left valve body is positioned on the outer face of the airbag so as to open or close the left vent hole;

the first tether includes one end coupled to the right valve body outside of the airbag and an other end coupled to a region of an occupant-side base fabric located to the right of a central portion of the occupant-side fabric in the vehicle width direction;

the second tether includes one end coupled to the left valve body outside of the airbag and an other end coupled to a region of the occupant-side base fabric located to the left of the central portion of the occupant-side fabric in the vehicle width direction;

wherein, upon deployment of the airbag, the first tether and the second tether are vertically stretched in a side view of the vehicle, and the first tether urges the right valve body so as to close the right vent hole, and the second tether urges the left valve body so as to close the left vent hole.

8. The vehicular airbag device according to claim 7, wherein the other end of the first tether and the other end of the second tether are disposed symmetrically to each other with respect to the central portion of the occupant-side base fabric in the vehicle width direction.

9. A vehicular airbag device comprising:

an airbag that is folded and accommodated in an accommodation portion provided in front of a vehicular seat, wherein the airbag is deployed toward an occupant seated in the vehicular seat by being supplied with a gas when a head-on collision occurs, the airbag includes a first vent hole and a second vent hole that are provided in a right side portion of the airbag in a vehicle width direction, and a third vent hole and a fourth vent hole that are provided in a left side portion of the airbag in the vehicle width direction, the vent holes allow the gas to be discharged to an outside of the airbag in restraining the occupant; and an opening degree change portion that changes an opening area of each of the first vent hole, the second vent hole, the third vent hole, and the fourth vent hole in accordance with a direction of impact of an upper body of the occupant with the airbag during deployment of the airbag, the opening degree change portion includes a first valve body, a second valve body, a third valve body, and a fourth valve body, and a pair of first tethers and a pair of second tethers;

the first valve body is positioned on an outer face of the airbag to close the first vent hole, the second valve body is positioned on the outer face of the airbag to close the second vent hole, the third valve body is positioned on the outer face of the airbag to close the third vent hole, and the fourth valve body is positioned on an outer face of the airbag to close the fourth vent hole;

the first tethers each includes a one end and an other end, the one end of one of the first tethers couples to the first valve body outside of the airbag, and the one end of the other of the first tethers couples to the third valve body outside of the airbag, and the other end of each of the first tethers couples to a region of an occupant-side base fabric located to the right of a central portion of the occupant-side base fabric in the vehicle width direction;

the second tethers each includes a one end and an other end, the one end of one of the second tethers couples to the second valve body outside of the airbag, and the one end of the other of the second tethers couples to the fourth valve body outside of the airbag, and the other end of each of the second tethers couples to a region of the occupant-side base fabric located to the left of the central portion of the occupant-side base fabric in the vehicle width direction;

wherein, upon deployment of the airbag, the first tethers and the second tethers are vertically stretched in a side view of the vehicle, and the one of first tethers urges the first valve body so as to close the first vent hole and the other of the first tethers urges the third valve body so as to close the third vent hole, and the one of the second tethers urge the second valve body so as to close the second vent hole and the other of the second tethers urges the fourth valve body so as to close the fourth vent hole.

* * * * *

UNITED STATES PATENT AND TRADEMARK OFFICE
CERTIFICATE OF CORRECTION

PATENT NO.         : 8,020,891 B2
APPLICATION NO.    : 12/616814
DATED              : September 20, 2011
INVENTOR(S)        : Osamu Fukawatase et al.

It is certified that error appears in the above-identified patent and that said Letters Patent is hereby corrected as shown below:

Column 8, line number 23 delete "&" insert --a--.

Signed and Sealed this
Thirty-first Day of July, 2012

David J. Kappos
*Director of the United States Patent and Trademark Office*